US008788850B1

(12) United States Patent
Kaul et al.

(10) Patent No.: US 8,788,850 B1
(45) Date of Patent: Jul. 22, 2014

(54) SYSTEMS AND METHODS FOR USING A SECURITY CIRCUIT TO MONITOR A VOLTAGE OF AN INTEGRATED CIRCUIT TO COUNTER SECURITY THREATS TO THE INTEGRATED CIRCUIT

(75) Inventors: Rohit K. Kaul, Austin, TX (US); Jon E. Tourville, Colorado Springs, CO (US)

(73) Assignee: Marvell International Ltd., Hamilton (BM)

( * ) Notice: Subject to any disclaimer, the term of this patent is extended or adjusted under 35 U.S.C. 154(b) by 612 days.

(21) Appl. No.: 12/684,424

(22) Filed: Jan. 8, 2010

Related U.S. Application Data

(60) Provisional application No. 61/146,467, filed on Jan. 22, 2009.

(51) Int. Cl.
*G06F 1/00* (2006.01)
(52) U.S. Cl.
USPC .......................................................... 713/300
(58) Field of Classification Search
USPC .......................................................... 713/300
See application file for complete search history.

(56) References Cited

U.S. PATENT DOCUMENTS

| 3,999,456 | A | * | 12/1976 | Tsunoo et al. | 84/681 |
| 5,798,934 | A | * | 8/1998 | Saigo et al. | 702/63 |
| 7,102,446 | B1 | * | 9/2006 | Lee et al. | 331/11 |
| 7,180,334 | B2 | * | 2/2007 | Starr | 327/156 |
| 7,747,887 | B2 | * | 6/2010 | Shipton et al. | 713/340 |
| 8,069,354 | B2 | * | 11/2011 | Min | 713/300 |
| 2006/0010312 | A1 | * | 1/2006 | Sugimori | 713/1 |
| 2007/0088940 | A1 | * | 4/2007 | Conley | 713/1 |
| 2008/0086655 | A1 | * | 4/2008 | Shipton et al. | 713/503 |

* cited by examiner

*Primary Examiner* — Mohammed Rehman

(57) ABSTRACT

One embodiment, having a corresponding method, features an integrated circuit comprising: a power supply terminal configured to receive electrical power; a core circuit powered by the electrical power, wherein the core circuit comprises a volatile memory configured to store data; a clock source configured to provide a clock signal at a selected frequency, wherein the selected frequency is one of a plurality of possible frequencies of the clock signal, and a processor configured to operate according to the clock signal; and a security circuit configured to reset the core circuit based on the selected frequency of the to clock signal and a voltage of the power supply terminal, wherein resetting the core circuit clears the data from the volatile memory.

16 Claims, 3 Drawing Sheets

SYSTEMS AND METHODS FOR USING A SECURITY CIRCUIT TO MONITOR A VOLTAGE OF AN INTEGRATED CIRCUIT TO COUNTER SECURITY THREATS TO THE INTEGRATED CIRCUIT

CROSS-REFERENCE TO RELATED APPLICATIONS

This application claims the benefit of U.S. Provisional Patent Application Ser. No. 61/146,467, filed on Jan. 22, 2009, the disclosure thereof incorporated by reference herein in its entirety.

BACKGROUND

The present disclosure relates generally to integrated circuits. More particularly, the present disclosure relates to countering security threats created by manipulation of the power supply rails of the integrated circuit.

An increasing number of devices include a system-on-a-chip (SOC), which is a single integrated circuit (chip) that includes a processor, volatile memory, and other components. During operation, the volatile memory may contain secure information such as security algorithms, unencrypted data, cryptographic keys, and the like. A hacker who has gained possession of such a device could gain access to the secure information by manipulating the voltage of the power supply provided to the SOC. For example, the hacker could increase the work load, which would cause the processor of the SOC to increase its operating frequency and voltage. The hacker could then suddenly reduce the voltage, causing the processor to hang because the voltage is insufficient to support the high operating frequency. Once the processor hangs, the hacker could gain access to the secure information in the non-volatile memory by a variety of methods, for example by using a test access port such as a Joint Test Action Group (JTAG) port.

SUMMARY

In general, in one aspect, an embodiment features an integrated circuit comprising: a power supply terminal configured to receive electrical power; a core circuit powered by the electrical power, wherein the core circuit comprises a volatile memory configured to store data; a clock source configured to provide a clock signal at a selected frequency, wherein the selected frequency is one of a plurality of possible frequencies of the clock signal, and a processor configured to operate according to the clock signal; and a security circuit configured to reset the core circuit based on the selected frequency of the clock signal and a voltage of the power supply terminal, wherein resetting the core circuit clears the data from the volatile memory.

Embodiments of the integrated circuit can include one or more of the following features. Some embodiments comprise a non-volatile memory configured to store a plurality of performance points, wherein each performance point associates one of a plurality of voltage ranges with one of the possible frequencies of the clock signal; wherein the security circuit resets the core circuit based on a performance point corresponding to the selected frequency of the clock signal. In some embodiments, the security circuit comprises: an analog-to-digital converter configured to provide a voltage number based on the voltage of the power supply terminal; a control circuit configured to assert a first error signal when the voltage of the power supply terminal is below the voltage range associated with the selected frequency of the clock signal; and a reset circuit configured to assert a reset signal when the first error signal is asserted; wherein the core circuit is reset when the reset signal is asserted. In some embodiments, the analog-to-digital converter asserts a second error signal when the voltage of the power supply terminal is below an operating range of the analog-to-digital converter; and the reset circuit asserts the reset signal when the second error signal is asserted.

In general, in one aspect, an embodiment features a method comprising: receiving electrical power at a power supply terminal of an integrated circuit; generating a clock signal within the integrated circuit; storing data in a volatile memory of the integrated circuit; processing the data according to the clock signal; determining a clock frequency of the clock signal; determining a voltage of the power supply terminal; and clearing the data from the volatile memory based on the clock frequency and the voltage.

Embodiments of the method can include one or more of the following features. In some embodiments, clearing the data from the volatile memory comprises: disconnecting the volatile memory from the power supply terminal based on the clock frequency and the voltage. In some embodiments, disconnecting the volatile memory of the integrated circuit from the power supply terminal comprises: determining an allowed voltage range for the clock frequency of the clock signal; and disconnecting the volatile memory from the power supply terminal of the integrated circuit when the voltage of the power supply terminal is below the allowed voltage range. Some embodiments comprise informing a processor of the integrated circuit when the voltage of the power supply terminal is above the allowed voltage range.

The details of one or more implementations are set forth in the accompanying drawings and the description below. Other features will be apparent from the description and drawings, and from the claims.

Figure 1:
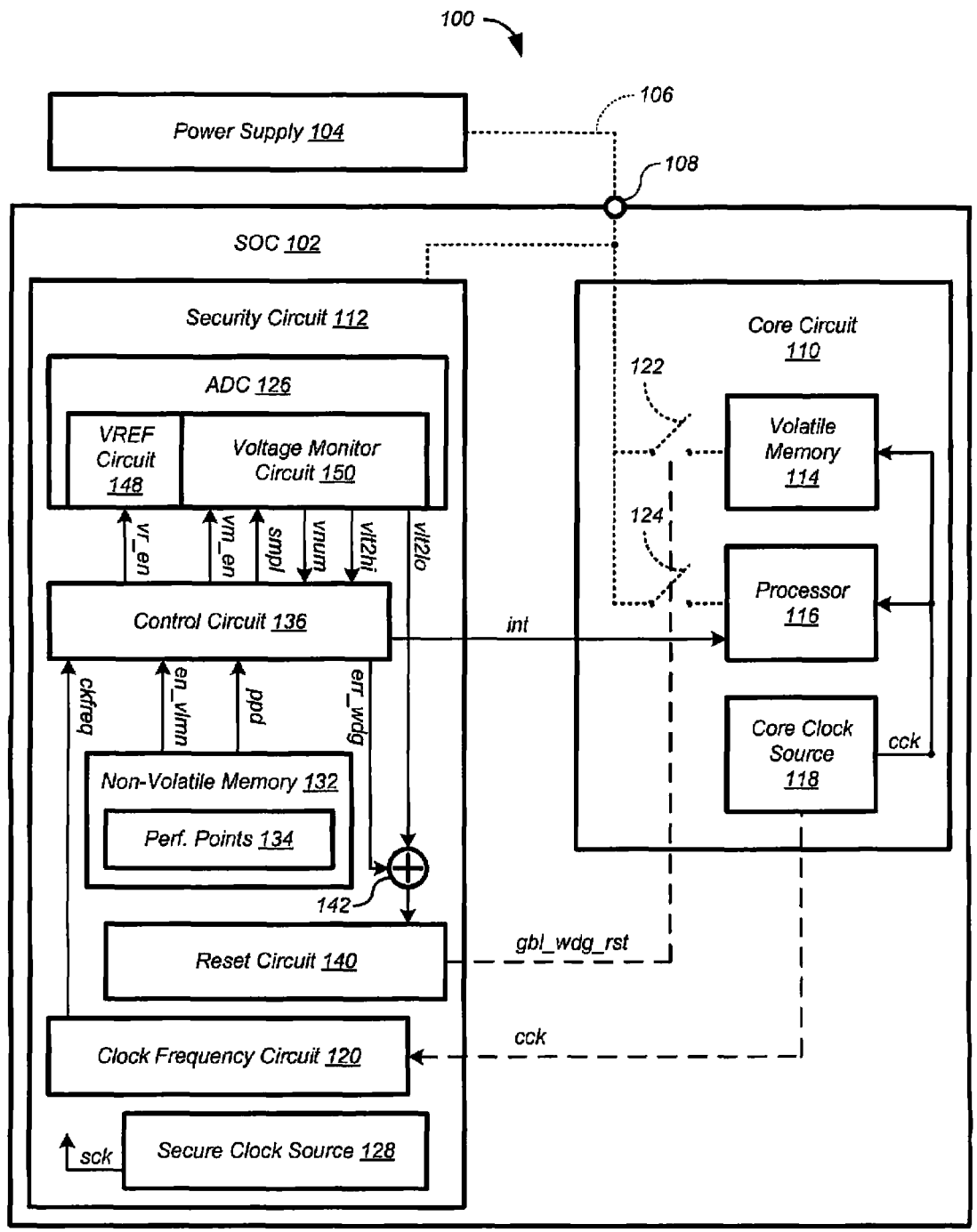
FIG. 1 shows elements of a SOC device according to some embodiments.

The leading digit(s) of each reference numeral used in this specification indicates the number of the drawing in which the reference numeral first appears.

DETAILED DESCRIPTION

Embodiments of the present disclosure provide elements of a system-on-a-chip (SOC) capable of countering security threats created by manipulation of the power supply rails of the SOC. FIG. 1 shows elements of a SOC device 100 according to some embodiments. Although in the described embodiments, the elements of SOC device 100 are presented in one arrangement, other embodiments may feature other arrangements. For example, elements of SOC device 100 can be implemented in hardware, software, or combinations thereof.

Referring to FIG. 1, SOC device 100 includes an SOC 102 powered by a power supply 104. In particular, SOC 102 includes a power supply terminal 108 to receive electrical power 106 from power supply 104. In FIG. 1, the path of electrical power 106 is shown as a dotted line for clarity. SOC 102 includes a core circuit 110 and a security circuit 112. Both core circuit 110 and security circuit 112 are powered by electrical power 106. SOC 102 is implemented as a single integrated circuit. Device 100 can be any sort of device.

Core circuit 110 includes a volatile memory 114, a processor 116, and a core clock source 118 to provide a core clock signal cck that is used by the elements of core circuit 110. Volatile memory 114 is connected to power supply terminal 108 by one or more memory power supply switches 122. Processor 116 is connected to power supply terminal 108 by one or more processor power supply switches 124.

Security circuit 112 includes a clock frequency circuit 120, an analog-to-digital converter (ADC) 126, a non-volatile memory 132, a control circuit 136, a reset circuit 140, an OR gate 142, and a secure clock source 128 to provide a secure clock signal sck that is used by the elements of security circuit 112. In some embodiments, secure clock source 128 is completely internal to SOC 102 to prevent access by a hacker.

Clock frequency circuit 120 determines the clock frequency of core clock signal cck, and provides a clock frequency signal ckfreq representing the clock frequency. Clock frequency circuit 120 can determine the clock frequency of core clock signal cck by direct measurement, by receiving a measurement from core clock source 118, or the like.

ADC 126 includes a voltage reference (VREF) circuit 148 and a voltage monitor circuit 150, which are enabled by a voltage reference enable signal vr_en and a voltage monitor enable signal vm_en, respectively. Voltage reference circuit 148 provides a reference voltage to voltage monitor circuit 150. Voltage monitor circuit 150 monitors the voltage of power supply terminal 108 based on the reference voltage.

ADC 126 can be implemented as a saturating-type ADC or the like. That is, ADC 126 saturates at a minimum voltage value. When the voltage of power supply terminal 108 is within the operating range of ADC 126, and ADC 126 receives a sample signal smpl from control circuit 136, ADC 126 provides a voltage number signal vnum that represents the voltage of power supply terminal 108. But when the voltage of power supply terminal 108 is below the operating range of ADC 126, ADC 126 provides an asynchronous low-voltage error signal vlt2*lo*. In some embodiments, ADC 126 has a full-scale measurement range of 0.6V-1.22V, a resolution of 6 bits (64 quantization levels), a voltage resolution of 9.84 mv, a startup time less than 20 microseconds, and a sample conversion time less than 20 microseconds. In some embodiments, ADC 126 has other parameter values.

Non-volatile memory 132 can be implemented as a content-addressable memory or the like. Non-volatile memory 132 stores a plurality of performance points 134. Each performance point 134 associates a respective allowed voltage range with each of a plurality of possible frequencies of core clock signal cck. For example, a performance point might associate a clock frequency of 624 MHz with an allowed voltage range of 1.1V-1.3V. Performance points 134 can be determined empirically for each SOC 102 individually, and then programmed into non-volatile memory 132 before sale. Non-volatile memory 132 provides a performance point data signal ppd representing performance points 134. Non-volatile memory 132 also provides a voltage monitoring enable signal en_vlmn to enable or disable voltage monitoring, for example in order to debug SOC 102.

Reset circuit 140 asserts a global watchdog reset signal gbl_wdg_rst based on error signals err_wdg and vlt2*lo*. In particular, OR gate 142 provides a logical OR of error signals err_wdg and vlt2*lo* to reset circuit 140, which asserts reset signal gbl_wdg_rst when either error signal err_wdg or vlt2*lo* is asserted. Reset signal gbl_wdg_rst controls power supply switches 122, 124, as described in detail below. The duration of global watchdog reset signal gbl_wdg_rst is set to allow volatile memory 114 of core circuit 110 to clear before power is restored. In FIG. 1, the path of reset signal gbl_wdg_rst is shown as a dashed line for clarity.

Figure 2:
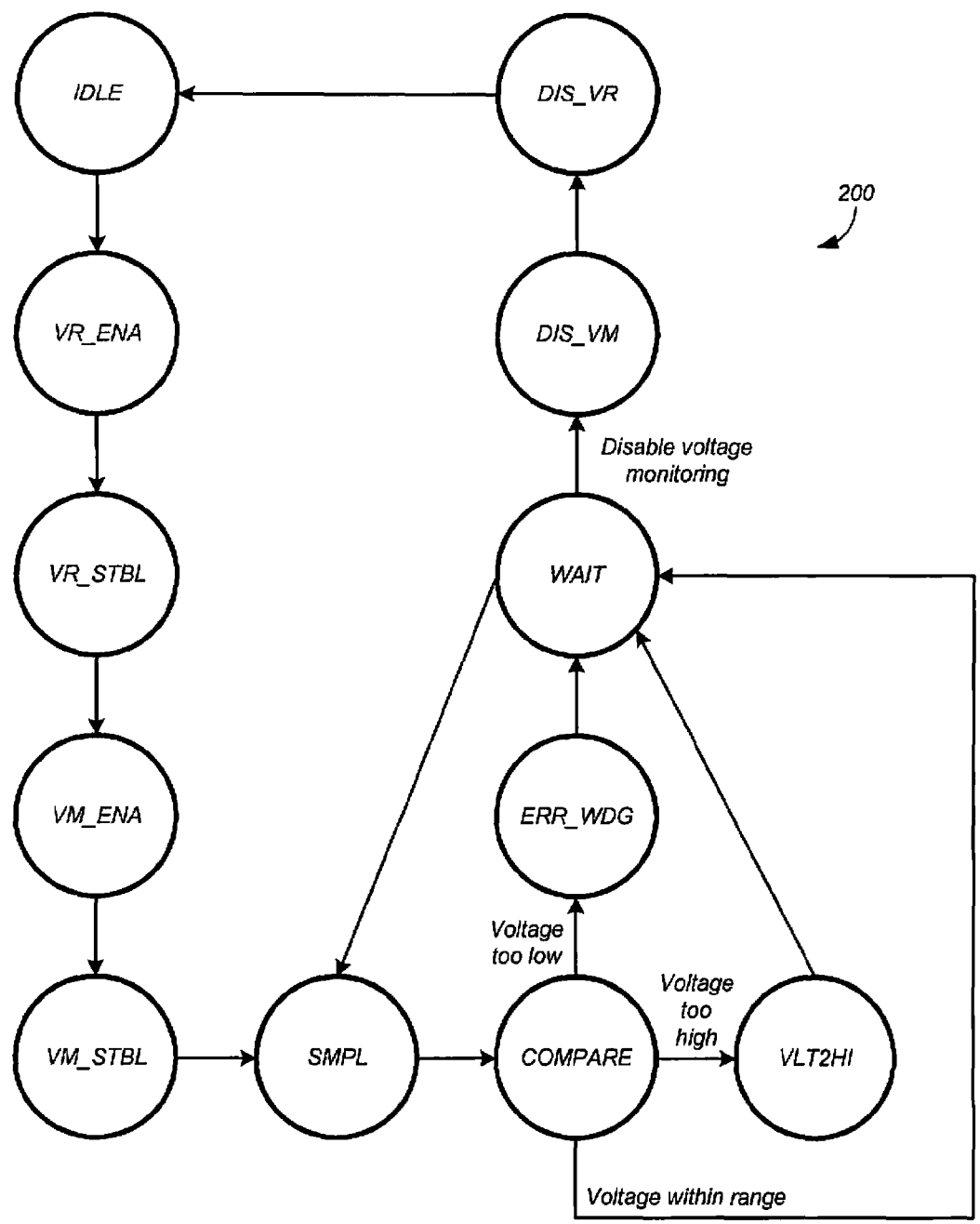
FIG. 2 shows a state machine for the SOC device of FIG. 1 according to some embodiments.

In some embodiments, control circuit 136 provides signals bg_en, vm_en, smpl, and err_wdg based on signals ckfreq, en_vlnm, ppd, and vnum according to a state machine. FIG. 2 shows a state machine 200 for SOC device 100 of FIG. 1 according to some embodiments. Although in the described embodiments, the elements of state machine 200 are presented in one arrangement, other embodiments may feature other arrangements. For example, in various embodiments, some or all of the states of state machine 200 can be executed in a different order, concurrently, and the like.

Referring to FIG. 2, state machine 200 begins in an idle state IDLE. State machine 200 starts automatically when power is applied to SOC 102 unless disabled by programming a predetermined bit in non-volatile memory 132, which causes the en_vlmn signal to be negated. State machine 200 continues to function until disabled by processor 116 through a secure thread.

After a configurable idle time, state machine 200 transitions to a voltage reference enable state VR_ENA, where voltage reference enable signal vr_en is asserted, thereby enabling voltage reference circuit 148. State machine 200 then transitions to a voltage reference stable state VR_STBL, where state machine 200 remains for an interval sufficient to allow voltage reference circuit 148 to stabilize.

State machine 200 then transitions to a voltage monitor enable state VM_ENA, where voltage monitor enable signal vm_en is asserted, thereby enabling voltage monitor circuit 150. State machine 200 then transitions to a voltage monitor stable state VM_STBL, where state machine 200 remains for an interval sufficient to allow voltage monitor circuit 150 to stabilize.

State machine 200 then transitions to a voltage sample state SMPL, where voltage sample signal smpl is asserted, thereby causing voltage monitor circuit 150 to sample the voltage of power supply terminal 108. In response, voltage monitor circuit 150 returns voltage number signal vnum representing the voltage of power supply terminal 108.

State machine 200 then transitions to a compare state COMPARE, where the value of voltage number vnum is compared to the allowed voltage range for the performance point 134 for the current clock frequency. The current clock frequency is represented by clock frequency signal ckfreq. If the comparison shows the value of voltage number vnum is within the allowed voltage range, indicating normal operation of core circuit 110, then state machine 200 transitions to a wait state WAIT.

If the comparison shows the value of voltage number vnum is below the voltage range, indicating a possible attack, then state machine 200 transitions to an error watchdog state ERR_WDG, where control circuit 136 asserts error watchdog signal err_wdg, thereby causing reset circuit 140 to assert global watchdog reset signal gbl_wdg_rst. In response to global watchdog reset signal gbl_wdg_rst, power supply switches 122 and 124 disconnect volatile memory 114 and processor 116, respectively, from power supply terminal 108. After a predetermined interval that is sufficient to allow the data stored in volatile memory 114 to clear, reset circuit 140 negates global watchdog reset signal gbl_wdg_rst. In response, power supply switches 122 and 124 re-connect volatile memory 114 and processor 116, respectively, to power supply terminal 108. State machine 200 then transitions to wait state WAIT.

If the comparison shows the value of voltage number vnum is above the voltage range, indicating that the voltage of power supply terminal 108 is unnecessarily high, then state machine 200 transitions to a high-voltage error state VLT2HI, where control circuit 136 asserts an interrupt signal int, causing an interrupt to processor 116 of core circuit 110. In response, processor 116 can reduce the voltage of power supply 104. State machine 200 then transitions to wait state WAIT.

State machine 200 remains in wait state WAIT for a predetermined wait interval. The wait interval should be long enough to allow the voltage of power supply 104 to change, for example in response to a command from processor 116. The wait interval can be extended to reduce the power consumed by security circuit 112. If voltage monitoring has not been disabled by processor 116, state machine 200 returns to voltage sample state SMPL.

However, if at wait state WAIT, voltage monitoring has been disabled by processor 116, state machine 200 transitions to a voltage monitor disable state DIS_VM, where voltage monitor enable signal vm_en is negated, thereby disabling voltage monitor circuit 150. State machine 200 then transitions to a voltage reference disable state DIS_VR, where voltage reference enable signal vr_en is negated, thereby disabling voltage reference circuit 148. State machine 200 then returns to idle state VR_STBL, where state machine 200 remains until voltage monitoring is again enabled by processor 116.

Figure 3:
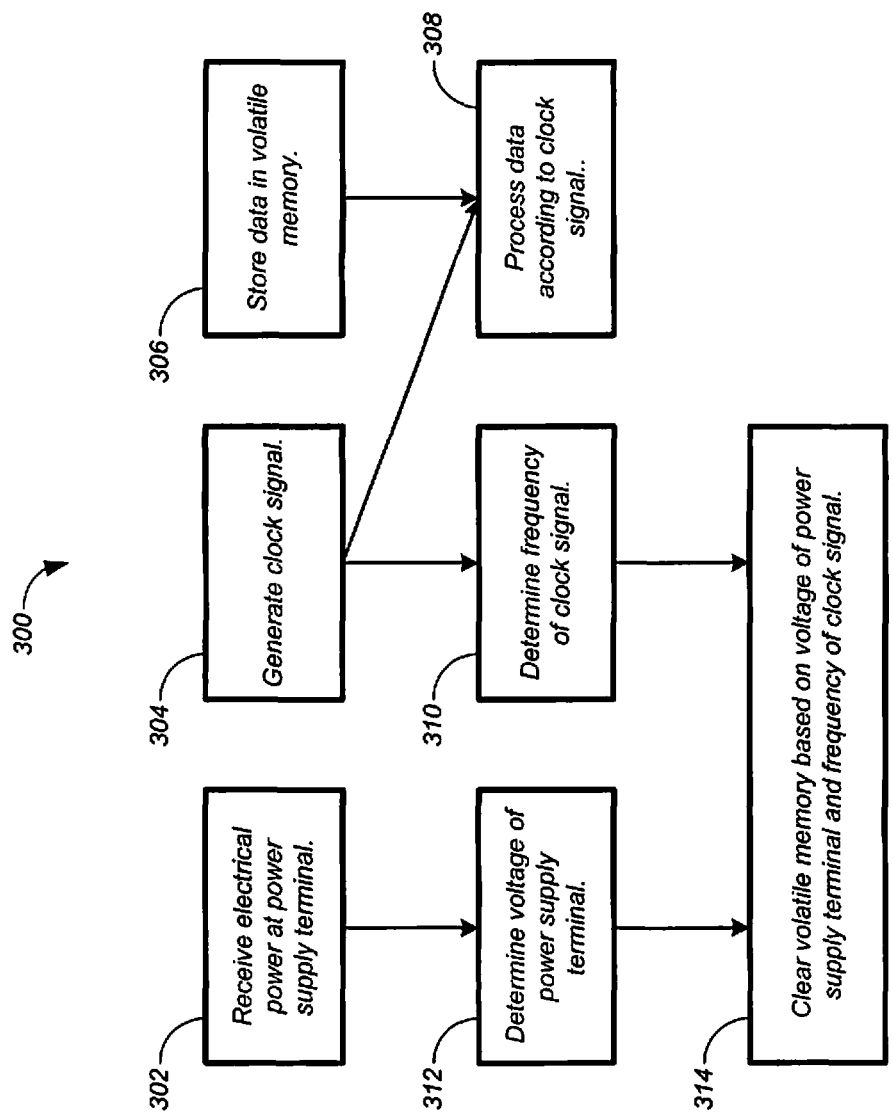
FIG. 3 shows a process for the device of FIG. 1 according to some embodiments.

FIG. 3 shows a process 300 for device 100 of FIG. 1 according to some embodiments. Although in the described embodiments, the elements of the processes disclosed herein are presented in one arrangement, other embodiments may feature other arrangements. For example, in various embodiments, some or all of the elements of the disclosed processes can be executed in a different order, concurrently, and the like.

Referring to FIG. 3, at 302 SOC 102 receives electrical power 106 at power supply terminal 108. At 304, clock source 118 generates core clock signal cck within SOC 102. At 306, volatile memory 114 of core circuit 110 stores data. At 308, processor 116 processes the data according to core clock signal cck. At 310, clock frequency circuit 120 of security circuit 112 determines the clock frequency of core clock signal cck. At 312, ADC 126 determines a voltage of power supply terminal 108. At 314, security circuit 112 clears the data from volatile memory 114 based on the clock frequency and the voltage of power supply terminal 108.

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method elements can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. An integrated circuit comprising:
a power supply terminal configured to receive a voltage;
a core circuit configured to be powered by the voltage received by the power supply terminal, wherein the core circuit comprises
a volatile memory configured to store data,
a clock source configured to provide a clock signal at a selected frequency, wherein the selected frequency is one of a plurality of possible frequencies of the clock signal, each of the plurality of possible frequencies being associated with a different respective allowed voltage range, and
a processor configured to operate according to the clock signal at the selected frequency; and
a security circuit configured to reset the core circuit based on a comparison between i) the respective allowed voltage range associated with the selected frequency of the clock signal and ii) the voltage received at the power supply terminal, wherein resetting the core circuit clears the data from the volatile memory.

2. A system-on-a-chip (SOC) comprising the integrated circuit of claim 1.

3. An integrated circuit, comprising:
a power supply terminal configured to receive a voltage;
a core circuit configured to be powered by the voltage received by the power supply terminal, wherein the core circuit comprises
a volatile memory configured to store data,
a clock source configured to provide a clock signal at a selected frequency, wherein the selected frequency is one of a plurality of possible frequencies of the clock signal, and
a processor configured to operate according to the clock signal at the selected frequency;
a security circuit configured to reset the core circuit based on i) the selected frequency of the clock signal and ii) the voltage of the power supply terminal, wherein resetting the core circuit clears the data from the volatile memory; and
a non-volatile memory configured to store a plurality of performance points, wherein each performance point associates one of a plurality of voltage ranges with one of the possible frequencies of the clock signal;
wherein the security circuit resets the core circuit based on a performance point corresponding to the selected frequency of the clock signal.

4. The integrated circuit of claim 3:
wherein the security circuit resets the core circuit when the voltage of the power supply terminal is below the voltage range associated with the selected frequency of the clock signal.

5. The integrated circuit of claim 3:
wherein the security circuit is configured to inform the processor when the voltage of the power supply terminal is above the voltage range associated with the selected frequency of the clock signal.

6. The integrated circuit of claim 3, wherein the security circuit comprises:
an analog-to-digital converter configured to provide a voltage number based on the voltage of the power supply terminal;
a control circuit configured to assert a first error signal when the voltage of the power supply terminal is below the voltage range associated with the selected frequency of the clock signal; and
a reset circuit configured to assert a reset signal when the first error signal is asserted;
wherein the core circuit is reset when the reset signal is asserted.

7. The integrated circuit of claim 6:
wherein the analog-to-digital converter asserts a second error signal when the voltage of the power supply terminal is below an operating range of the analog-to-digital converter; and
wherein the reset circuit asserts the reset signal when the second error signal is asserted.

8. A method comprising:
receiving a voltage at a power supply terminal of an integrated circuit;
generating, within the integrated circuit, a clock signal at a selected one of a plurality of possible frequencies, wherein each of the plurality of possible frequencies is associated with a different respective allowed voltage range;
storing data in a volatile memory of the integrated circuit;
processing the data according to the clock signal at the selected frequency; and
clearing the data from the volatile memory based on a comparison between i) the respective allowed voltage range associated with the selected frequency of the clock signal and ii) the voltage received at the power supply terminal.

9. The method of claim 8, wherein clearing the data from the volatile memory comprises:
determining the respective allowed voltage range associated with the selected frequency of the clock signal; and
clearing the data from the volatile memory when the voltage received at the power supply terminal is below the respective allowed voltage range associated with the selected frequency of the clock signal.

10. The method of claim 8, wherein clearing the data from the volatile memory comprises:
disconnecting the volatile memory from the power supply terminal of the integrated circuit.

11. The method of claim 9, further comprising:
informing a processor of the integrated circuit when the voltage received at the power supply terminal is above the respective allowed voltage range associated with the selected frequency of the clock signal.

12. The integrated circuit of claim 1:
wherein the security circuit is configured to reset the core circuit when the voltage received at the power supply terminal is below the respective allowed voltage range associated with the selected frequency of the clock signal.

13. The integrated circuit of claim 1:
wherein the security circuit is configured to inform the processor when the voltage received at the power supply terminal is above the respective allowed voltage range associated with the selected frequency of the clock signal.

14. The integrated circuit of claim 1, wherein the security circuit comprises:
an analog-to-digital converter configured to provide a voltage number based on the voltage received at the power supply terminal;
a control circuit configured to assert a first error signal when the voltage received at the power supply terminal is below the respective allowed voltage range associated with the selected frequency of the clock signal; and
a reset circuit configured to assert a reset signal when the first error signal is asserted;
wherein the core circuit is reset when the reset signal is asserted.

15. The integrated circuit of claim 14:
wherein the analog-to-digital converter is configured to assert a second error signal when the voltage received at the power supply terminal is below an operating range of the analog-to-digital converter; and
wherein the reset circuit is configured to assert the reset signal when the second error signal is asserted.

16. The integrated circuit of claim 1, further comprising:
a non-volatile memory configured to store a plurality of performance points, wherein each performance point associates one of the plurality of possible frequencies with one of the respective allowed voltage ranges,
wherein the security circuit is configured to reset the core circuit based on a performance point corresponding to the selected frequency of the clock signal.

* * * * *